(12) United States Patent
Suganuma et al.

(10) Patent No.: US 11,705,560 B2
(45) Date of Patent: Jul. 18, 2023

(54) FUEL CELL SYSTEM

(71) Applicant: TOYOTA JIDOSHA KABUSHIKI KAISHA, Toyota (JP)

(72) Inventors: Hiroyuki Suganuma, Aichi-ken (JP); Masaaki Matsusue, Mishima (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 18 days.

(21) Appl. No.: 17/648,984

(22) Filed: Jan. 26, 2022

(65) Prior Publication Data

US 2022/0246956 A1 Aug. 4, 2022

(30) Foreign Application Priority Data

Feb. 3, 2021 (JP) .................................. 2021-015882

(51) Int. Cl.
*H01M 8/04089* (2016.01)
*H01M 8/04746* (2016.01)
*H01M 8/04791* (2016.01)

(52) U.S. Cl.
CPC ... *H01M 8/04097* (2013.01); *H01M 8/04761* (2013.01); *H01M 2250/20* (2013.01)

(58) Field of Classification Search
CPC ......... H01M 8/04097; H01M 8/04761; H01M 2250/20; H01M 8/0438; H01M 8/04798; H01M 8/04089; H01M 8/04104; H01M 8/0606; Y02E 60/50

USPC ........................................................ 429/444
See application file for complete search history.

(56) References Cited

U.S. PATENT DOCUMENTS

2014/0212777 A1* 7/2014 Hofer ................ H01M 8/04783
429/415

FOREIGN PATENT DOCUMENTS

JP 2020126729 A 8/2020

* cited by examiner

*Primary Examiner* — Christian Roldan
(74) *Attorney, Agent, or Firm* — Dickinson Wright, PLLC

(57) ABSTRACT

A fuel cell system includes a fuel cell that generates electricity by causing reaction of a fuel component contained in fuel gas, a supply path, a control valve, an ejector, a return path, and a controller. The control valve is provided on the supply path. The ejector is provided in a section on the supply path between the control valve and the fuel cell. The return path is connected between an exhaust port of the fuel cell and the ejector, and returns off-gas discharged from the exhaust port to the supply path by suction force generated by the ejector. The controller selectively executes a normal operation and a particular operation. In the particular operation, the control valve is continuously or intermittently opened to a second opening degree smaller than a first opening degree, when the fuel gas is supplied to the fuel cell at a first supply amount.

6 Claims, 3 Drawing Sheets

FUEL CELL SYSTEM

CROSS-REFERENCE TO RELATED APPLICATION

This application claims priority to Japanese Patent Application No. 2021-015882 filed on Feb. 3, 2021, incorporated herein by reference in its entirety.

BACKGROUND

1. Technical Field

The technology disclosed in the present specification relates to a fuel cell system.

2. Description of Related Art

Japanese Unexamined Patent Application Publication No. 2020-126729 (JP 2020-126729 A) discloses a fuel cell system including a fuel cell, an ejector, and a supply device. The ejector takes in off-gas discharged from the fuel cell, mixes the off-gas with fuel gas supplied from the supply device, and supplies the off-gas to the fuel cell. Accordingly, any fuel component remaining in the off-gas can be supplied to the fuel cell.

In the off-gas, the concentration of impurities such as nitrogen and water vapor, for example, is increased as a result of partial consumption of the fuel component, and the concentration of the fuel component becomes lower. Accordingly, when fuel gas containing a high concentration of the fuel component needs to be supplied to the fuel cell, such as when warming up the fuel cell for example, it is preferable to reduce the amount of off-gas supplied to the fuel cell, and supply, primarily from the supply device, the fuel cell with fuel gas containing a high concentration of the fuel component.

With respect to the above, the fuel cell system in JP 2020-126729 A further includes a detour route connected to the fuel cell without passing through an ejector, and a third supply device for supplying fuel gas to the detour route. According to such a configuration, by supplying the fuel gas from the third supply device to the fuel cell through the detour route, the fuel gas containing no off-gas can be supplied to the fuel cell.

SUMMARY

However, the fuel cell system in JP 2020-126729 A needs to be provided with the detour route and the third supply device, so that the structure and control of the fuel cell system become complicated. The present specification provides a technique capable of suppressing decrease in the concentration of the fuel component without providing a detour route and a third supply device.

An aspect of a fuel cell system disclosed in the present specification includes a fuel cell configured to generate electricity by causing reaction of a fuel component contained in fuel gas, a supply path, a control valve, an ejector, a return path, and a controller. The supply path is connected to a supply port of the fuel cell, and supplies the fuel gas to the supply port. The control valve is provided on the supply path and is configured to be able to adjust an opening degree of the control valve. The ejector is provided in a section on the supply path between the control valve and the fuel cell. The return path is connected between an exhaust port of the fuel cell and the ejector, and returns off-gas discharged from the exhaust port to the supply path by suction force generated by the ejector. The controller controls the control valve. The controller is configured to selectively execute a normal operation in which at least the one control valve is intermittently opened at a duty ratio corresponding to a target value for a supply amount of the fuel gas, and a particular operation for supplying, to the fuel cell, fuel gas containing the fuel component at a higher concentration than in the normal operation. When the fuel gas is supplied to the fuel cell at a first supply amount in the normal operation, the control valve is intermittently opened to a first opening degree. When the fuel gas is supplied to the fuel cell at the first supply amount in the particular operation, the control valve is continuously or intermittently opened to a second opening degree smaller than the first opening degree.

The fuel cell system described above selectively executes the normal operation and the particular operation. When the normal operation and the particular operation are compared, even in a case where the same first supply amount of the fuel gas is supplied to the fuel cell, the opening degree of the control valve is adjusted to the first opening degree in the normal operation, whereas the opening degree of the control valve is adjusted to the second opening degree in the particular operation. When the opening degree of the control valve is adjusted to the first opening degree as in the normal operation, the fuel gas is supplied to the ejector at a sufficient flow rate, and the ejector generates the suction force for taking in the off-gas. Thus, in the normal operation, the fuel gas containing the off-gas is supplied to the fuel cell. On the other hand, when the opening degree of the control valve is adjusted to the second opening degree as in the particular operation, the fuel gas of the limited flow rate is supplied to the ejector, and generation of the suction force in the ejector is prohibited or is suppressed. As a result, the amount of the off-gas returned to the supply path is reduced, and the proportion of fuel component contained in the fuel gas is increased. Accordingly, in the particular operation, the fuel cell can be supplied with a higher concentration of the fuel gas than in the normal operation. Thus, the fuel cell system disclosed in the present specification can suppress a decrease in the fuel gas concentration due to the off-gas without providing a detour route and a third supply device.

In the above aspect, the fuel cell system may further include a second control valve. In this case, the ejector may include a first nozzle configured to supply the fuel gas from the control valve and a second nozzle configured to supply the fuel gas from the second control valve. According to such a configuration, the supply amount of the fuel gas supplied to the fuel cell and the return amount of the off-gas returned therein can be appropriately adjusted by controlling each of the two control valves.

In the above aspect, a diameter of the second nozzle may be smaller than a diameter of the first nozzle. According to such a configuration, the supply amount of the fuel gas and the suction force of the ejector can be readily balanced by the two nozzles having large and small diameters.

In the above aspect, in the normal operation, when the fuel gas is supplied to the fuel cell at the first supply amount, the second control valve may be intermittently opened instead of the control valve. However, in another embodiment, the control valve may be opened when the fuel gas is supplied at the first supply amount in the normal operation.

In the above aspect, the second control valve may be opened intermittently in the particular operation as well. In the particular operation, when the suction force of the ejector is excessively low, the fuel gas may reflux from the supply path to the return path side. In such a case, suction force for canceling out this reflux can be generated in the ejector, by supplying fuel gas from the second control valve to the ejector in a complementary manner.

In the above aspect, a first pressure sensor disposed on the supply path and a second pressure sensor disposed on the return path may be further provided. According to such a configuration, the controller can control the suction force of the ejector according to the pressure detected by each pressure sensor.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

Embodiments

Figure 1:
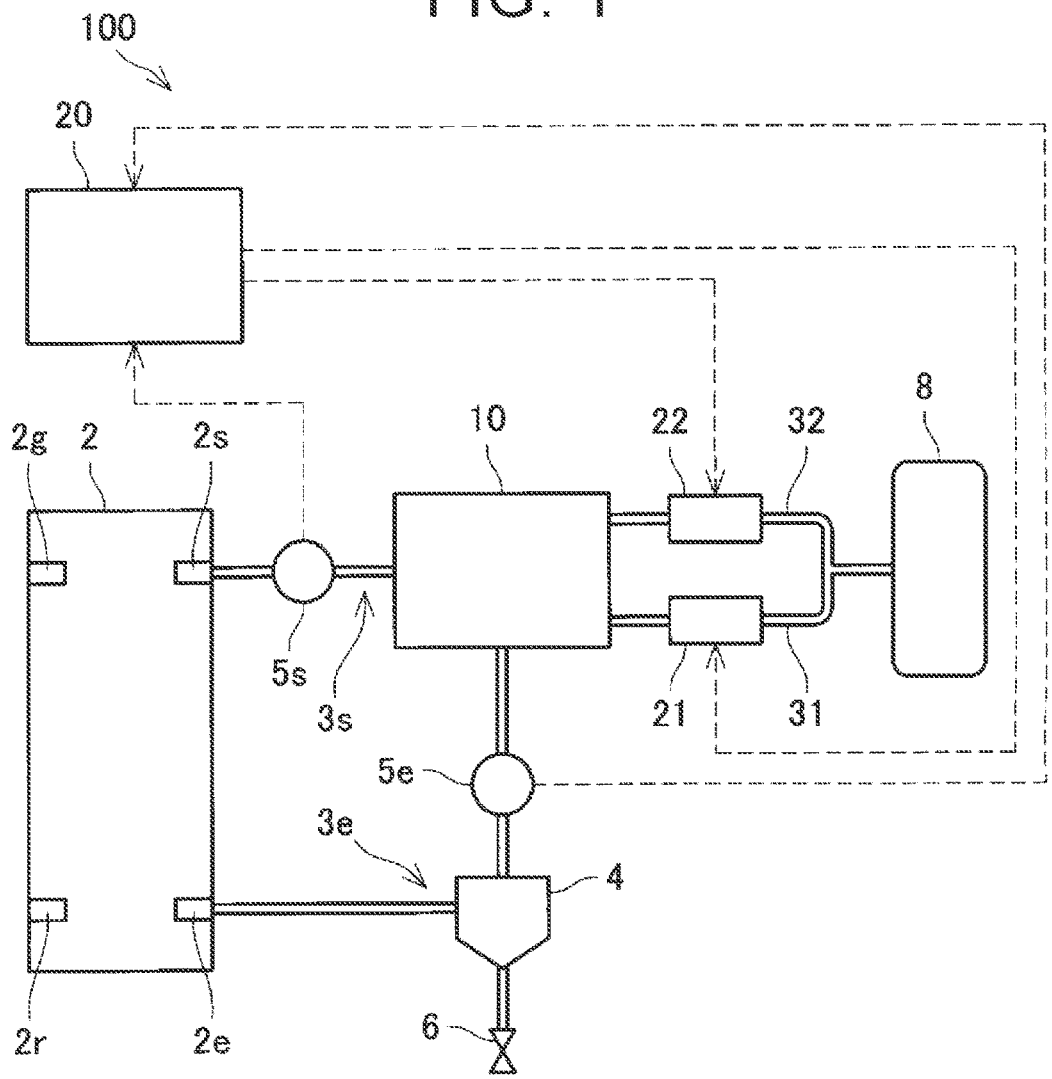
FIG. 1 illustrates a configuration diagram of a fuel cell system 100 according to a first embodiment.

A fuel cell system 100 according to a first embodiment will be described with reference to FIG. 1. The fuel cell system 100 includes a fuel cell 2, a vapor-liquid separator 4, a vent/drain valve 6, a fuel gas tank 8, an ejector 10, and a controller 20. The fuel cell system 100 is a system for causing reaction of a fuel component gas (e.g., hydrogen gas) accommodated in the fuel gas tank 8 and an oxidant gas (e.g., oxygen gas) included in the air, in the fuel cell 2, to generate electricity. The fuel cell system 100 is installed in, for example, a fuel cell vehicle.

Although not shown, a stack in which a plurality of solid polymer electrolyte cells is stacked is accommodated within the fuel cell 2. Fuel gas containing fuel component gas is supplied to the fuel cell 2 through a fuel gas supply port 2s. Air is supplied to the fuel cell 2 through an air supply port 2g. The fuel cell 2 generates electricity by chemical reaction of the hydrogen gas in the fuel gas that is supplied (i.e., the fuel component gas) with the oxygen gas in the air, in the fuel cell 2. The fuel cell 2 further includes a fuel gas exhaust port 2e and an air exhaust port 2r. The fuel gas (hereinafter may be referred to as "off-gas") that has passed through the fuel cell 2 is discharged from the fuel cell 2 through the fuel gas exhaust port 2e. The air that has passed through the fuel cell 2 is discharged from the fuel cell 2 through the air exhaust port 2r. Although not shown, an air supply path for supplying air to the fuel cell 2 is connected to the air supply port 2g, and an air discharge path is connected to the air exhaust port 2r.

The fuel cell system 100 further includes a supply path 3s and a return path 3e. The supply path 3s is a pipe that connects the fuel gas tank 8 and the fuel gas supply port 2s of the fuel cell 2. The supply path 3s branches into a first supply path 31 and a second supply path 32 on the downstream side of the fuel gas tank 8 (i.e., the fuel cell 2 side). The first supply path 31 is connected to the ejector 10 through a first control valve 21. The second supply path 32 is connected to the ejector 10 through a second control valve 22. The fuel component gas in the fuel gas tank 8 is supplied to the ejector 10 by the first supply path 31 and the second supply path 32. The first supply path 31 and the second supply path 32 merge at the ejector 10. As a result, the supply path 3s is connected to the fuel gas supply port 2s of the fuel cell 2 as a single flow path on the downstream side of the ejector 10. Thus, the supply path 3s supplies the fuel component gas in the fuel gas tank 8 to the fuel gas supply port 2s. A first pressure sensor 5s for detecting pressure inside the supply path 3s is disposed on the supply path 3s.

The return path 3e is a pipe that connects the fuel gas exhaust port 2e and the ejector 10. Off-gas is discharged from the fuel cell 2 to the return path 3e through the fuel gas exhaust port 2e. The vapor-liquid separator 4 is disposed on the return path 3e.

The vapor-liquid separator 4 separates water from the off-gas in the return path 3e. When the vent/drain valve 6 is opened, the water that has been separated from the off-gas and has accumulated at the bottom of the vapor-liquid separator 4 is discharged from the return path 3e. A second pressure sensor 5e for detecting pressure inside the return path 3e is disposed on the return path 3e.

The controller 20 controls the first control valve 21 and the second control valve 22. The pressure inside the fuel gas tank 8 is higher than the pressure inside the supply path 3s. When the first control valve 21 is opened, the fuel component gas in the fuel gas tank 8 is supplied to the ejector 10 through the first supply path 31. Similarly, when the second control valve 22 is opened, the fuel component gas in the fuel gas tank 8 is supplied to the ejector 10 through the second supply path 32. The first control valve 21 is typically a linear solenoid valve, and the opening degree thereof can be adjusted. On the other hand, the second control valve 22 is typically an on-off valve and can be maintained in a fully-open state or a fully-closed state. The controller 20 opens the first control valve 21 and the second control valve 22 according to a target value of a supply amount of the fuel gas. The controller 20 acquires the detected pressure from each of the pressure sensors 5s and 5e.

Figure 2:
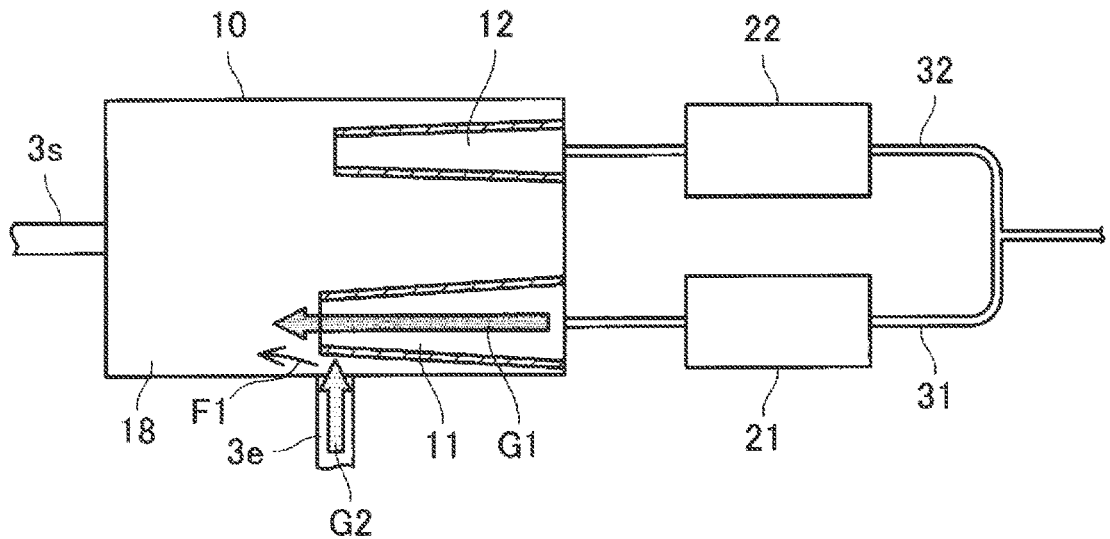
FIG. 2 illustrates an enlarged view of surroundings of an ejector 10 according to the first embodiment during normal operations.

As shown in FIG. 2, the ejector 10 includes a first nozzle 11, a second nozzle 12, and a mixing portion 18. The first nozzle 11 is connected to the first control valve 21 through the first supply path 31, and the second nozzle 12 is connected to the second control valve 22 through the second supply path 32. The return path 3e is further connected to the ejector 10. Each of the nozzles 11 and 12 has a hollow shape, a cross-sectional view of each nozzle is illustrated in FIG. 2. The nozzles 11 and 12 are both tapered down, with the diameters thereof slightly reduced toward the downstream side (i.e., the fuel cell 2 side). The mixing portion 18 communicates with each of the nozzles 11 and 12. When fuel component gas G1 passes through the first nozzle 11, for example, the flow velocity of the fuel component gas G1 becomes faster at the outlet of the first nozzle 11 that is tapered down. The air around the outlet of the first nozzle 11 of the mixing portion 18 is dragged by the fuel component gas G1 that has a high flow velocity. As a result, the pressure around the outlet of the first nozzle 11 decreases. Thus, suction force F1 that draws in off-gas G2 in the return path 3e is generated in the mixing portion 18 of the ejector 10. The ejector 10 takes in the off-gas G2 into the mixing portion 18 by the suction force F1. The ejector 10 supplies the fuel gas obtained by mixing the off-gas G2 and the fuel component gas G1, to the fuel cell 2 through the supply path 3s. In this way, the ejector 10 returns the off-gas G2 to the supply path 3s.

As described above, the off-gas G2 is the fuel gas discharged from the fuel gas exhaust port 2e of the fuel cell 2 after electricity is generated (i.e., after the hydrogen gas and the oxygen gas have reacted). However, the off-gas G2 contains unreacted hydrogen gas (i.e., fuel component gas) that has passed through the fuel cell 2, in addition to impurities (e.g., nitrogen and water vapor) caused by generating electricity. The ejector 10 supplies the off-gas G2 to the fuel cell 2 in addition to the fuel component gas G1 supplied from the fuel gas tank 8. Thus, the unreacted fuel component gas that has passed through the fuel cell 2 can be used to generate electricity.

As illustrated in FIG. 2, the diameter of the second nozzle 12 is smaller than the diameter of the first nozzle 11. The second nozzle 12 is used when a relatively small amount of fuel component gas is supplied to the fuel cell 2. The suction force that draws in the off-gas G2 is generated in the ejector 10 when the fuel component gas is supplied through the second nozzle 12 as well, in the same way as when the fuel component gas G1 is supplied through the first nozzle 11. The controller 20 (see FIG. 1) acquires, from a host controller (now shown), a target value of the supply amount of fuel gas to be supplied to the fuel cell 2, in accordance with the amount of depression of the accelerator pedal of the fuel cell vehicle, for example. The controller 20 determines which nozzle is used to supply the fuel gas, in accordance with the acquired target value. The controller 20 transmits, to the control valve connected to the nozzle that has been determined, a signal for instructing the valve to open. Thus, the controller 20 supplies the fuel gas of the target value supply amount to the fuel cell 2.

Figure 3:
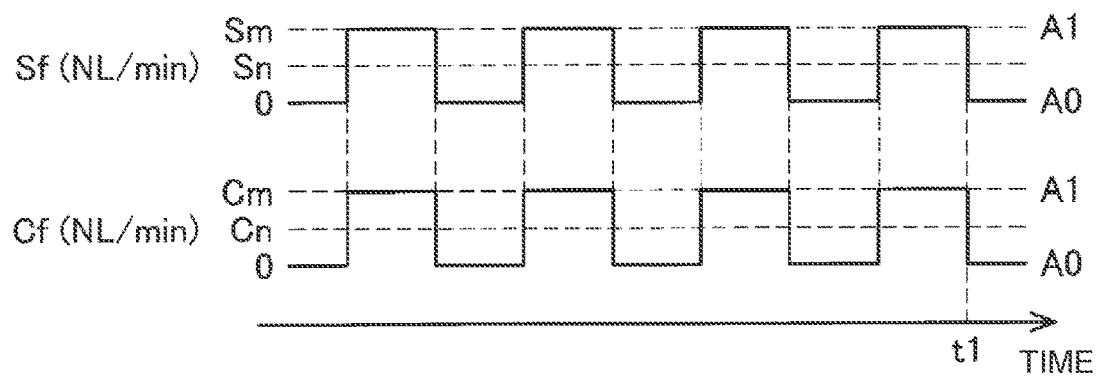
FIG. 3 shows a change in an opening degree of a first control valve 21 during normal operations, and a relation between a fuel component gas supply amount Sf caused by the change and an off-gas intake amount Cf caused by the change.

With reference to FIG. 3, the opening degree of the first control valve 21, and the relation between a fuel component gas supply amount Sf that is the amount of the fuel component gas supplied to the ejector 10 and an off-gas intake amount Cf that is the amount of the off-gas in which the ejector 10 takes into the mixing portion 18 (see FIG. 2), will be described. FIG. 3 illustrates the relation thereof when the controller 20 executes normal operations. In FIG. 3, the opening degree at which the first control valve 21 is fully open is indicated by a first opening degree A1, and the opening degree at which the first control valve 21 is fully closed is indicated by a fully-closed opening degree A0. In the following, a case in which the controller 20 intermittently opens the first control valve 21 during normal operations will mainly be described, but the same applies to the second control valve 22 as well.

During normal operations, the controller 20 determines the duty ratio for controlling the on and off of the first control valve 21 based on an acquired target value S1. The controller 20 intermittently opens the first control valve 21 to the first opening degree A1 based on the determined duty ratio. As a result, a maximum supply amount Sm of the fuel component gas G1 is intermittently supplied to the ejector 10, as shown in FIG. 3. When the first control valve 21 is intermittently opened at a duty ratio corresponding to the target value S1, a normal supply amount Sn of the fuel component gas is supplied to the ejector 10 (see FIG. 2) during a predetermined time t1.

As described above, the ejector 10 (see FIG. 2) takes in the off-gas G2 by the suction force generated when the fuel component gas G1 passes through the nozzle. Accordingly, the off-gas intake amount Cf is taken into the ejector 10 so as to be synchronized with the intermittent supply of the fuel component gas G1, as shown in FIG. 3. When the first control valve 21 is intermittently opened at a duty ratio corresponding to the target value S1, a normal intake amount Cn of the off-gas is taken into the ejector 10 during the predetermined time t1.

Figure 4:
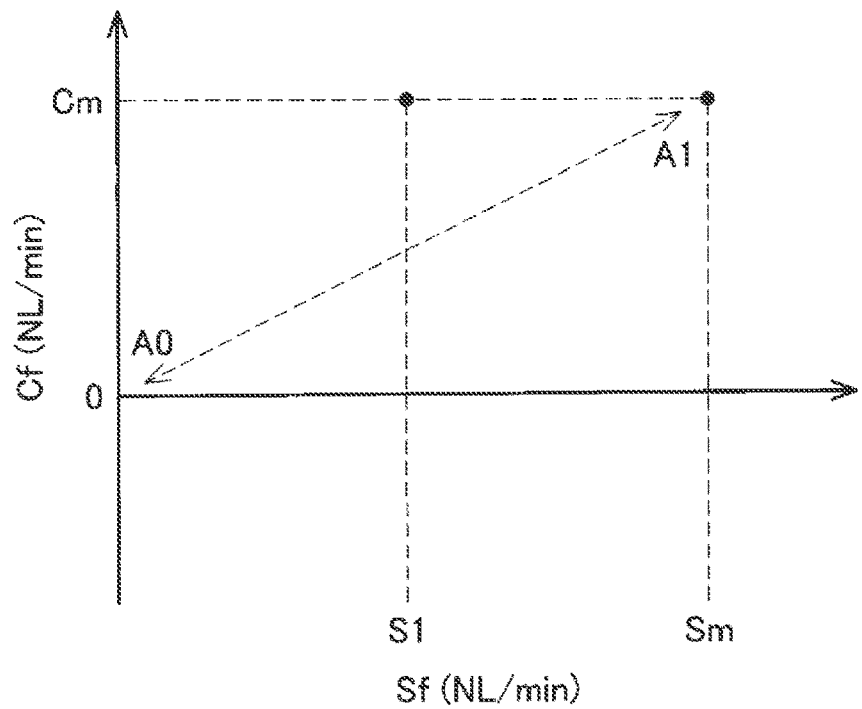
FIG. 4 shows a relation between the fuel component gas supply amount Sf and the off-gas intake amount Cf during normal operations.

As indicated by a broken line arrow in FIG. 4, when the controller 20 (see FIG. 1) controls the on and off of the first control valve 21, the fuel component gas supply amount Sf and the off-gas intake amount Cf are both greatest when the opening degree of the first control valve 21 is the first opening degree A1, and are both zero when the opening degree of the first control valve 21 is the fully-closed opening degree A0. When the first control valve 21 is intermittently opened, the normal intake amount Cn of the off-gas is also supplied to the fuel cell 2 in addition to the normal supply amount Sn of the fuel component gas. The target value S1 of the fuel gas supply amount is the total value of the normal supply amount Sn and the normal intake amount Cn. When normal operations are being executed, the controller 20 intermittently opens the first control valve 21 to the first opening degree A1, to supply the fuel gas of the target value S1 including the off-gas G2 to the fuel cell 2.

As described above, the off-gas G2 contains impurities (e.g., nitrogen and water vapor) after the reaction, in addition to the fuel component gas (i.e., hydrogen gas). Accordingly, when the off-gas G2 is added to the fuel component gas G1 supplied from the fuel gas tank 8, the concentration of the hydrogen gas supplied to the fuel cell 2 decreases. That is to say, the fuel gas containing the off-gas G2 has a low concentration of the hydrogen gas. Here, under conditions in which the outside air temperature is low, for example, freezing may occur inside the fuel cell 2 (see FIG. 1). In this case, the frozen state should be resolved at an early stage, by heat generated by the fuel cell 2. However, when freezing occurs, the impurities after reaction may not be appropriately discharged into the return path 3e (see FIG. 1) at the frozen portion, and may remain inside the fuel cell 2. As a result, the concentration of the hydrogen decreases at the location where freezing has occurred. Supplying fuel gas having a low hydrogen concentration to the fuel cell 2 in such a state may lead to an even lower hydrogen concentration at the frozen portion, and the fuel cell 2 may not generate electricity properly. As a result, resolving the freezing of the fuel cell 2 becomes difficult.

Here, when freezing occurs in the fuel cell 2 (see FIG. 1), the impurities remain in the fuel cell 2, and accordingly the amount of the off-gas in the return path 3e decreases relative to the amount of the fuel gas in the supply path 3s (see FIG. 1). As a result, the amount of the off-gas in the return path 3e discharged from the fuel cell 2 becomes smaller than the amount of the fuel gas in the supply path 3s supplied to the fuel cell 2. Thus, when freezing occurs in the fuel cell 2, the pressure in the return path 3e becomes smaller than the pressure in the supply path 3s. The controller 20 compares the pressure in the supply path 3s acquired from the first pressure sensor 5s with the pressure in the return path 3e acquired from the second pressure sensor 5e. When the difference therebetween becomes larger than a predetermined threshold value, the controller 20 determines that freezing has occurred in the fuel cell 2. In this case, the controller 20 executes particular operations described below, instead of the normal operations described with reference to FIG. 3.

Figure 5:
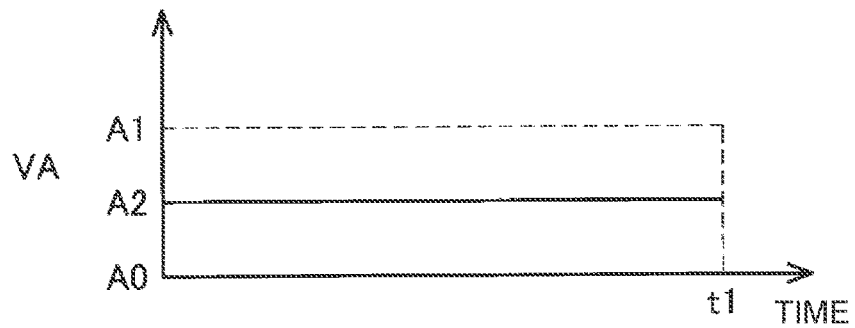
FIG. 5 shows the opening degree of the first control valve 21 during particular operations.

When the target value S1 is acquired during particular operations, the controller 20 maintains the first control valve 21 at a second opening degree A2 during a predetermined time t1 as shown in FIG. 5. In the present embodiment, the second opening degree A2 is the opening degree of the first control valve 21 for supplying the fuel component gas G1 (see FIG. 2) of the target value S1, and is smaller than the first opening degree A1. The controller 20 continuously opens the first control valve 21 to the second opening degree A2. As a result, the fuel component gas G1 of the target value S1 is supplied to the fuel cell 2.

Figure 6:
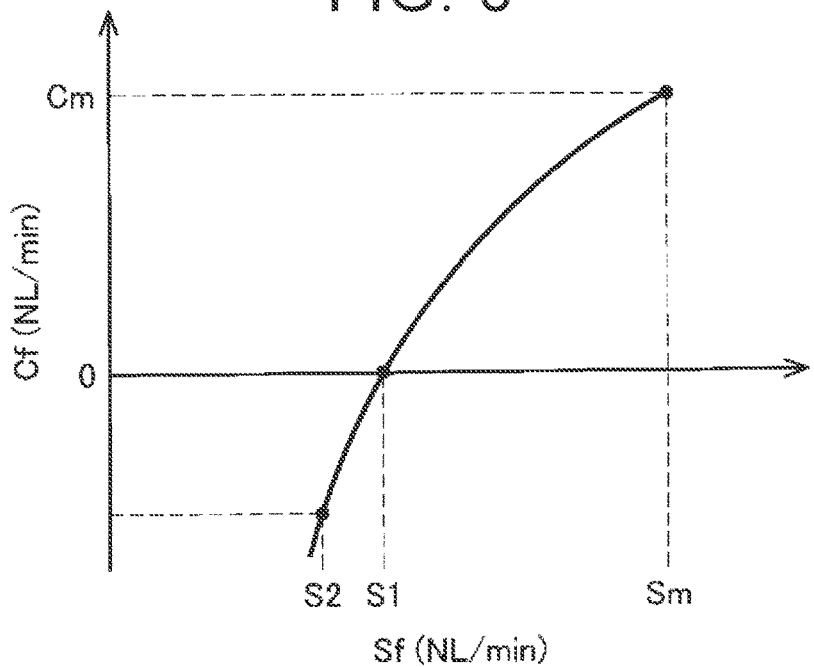
FIG. 6 shows the relation between the fuel component gas supply amount Sf and the off-gas intake amount Cf during particular operations.

As described above, the ejector 10 (see FIG. 2) takes in the off-gas G2 into the mixing portion 18 by the suction force corresponding to the amount of the fuel component gas G1 passing through the nozzles 11 and 12. Thus, when the fuel component gas supply amount Sf becomes small, the suction force of the ejector 10 also weakens, and the off-gas intake amount Cf also becomes small, as illustrated in FIG. 6. When the fuel component gas supply amount Sf becomes even smaller and there is no more decrease in pressure at the outlet of the first nozzle 11 (see FIG. 2), the off-gas intake amount Cf becomes zero. That is to say, in this case, the ejector 10 does not take in the off-gas G2.

With the ejector 10 according to the embodiment, when the fuel component gas supply amount Sf is at the target value S1, the off-gas intake amount Cf becomes zero. When the controller 20 continuously opens the first control valve 21 to the second opening degree A2 corresponding to the target value S1, the first nozzle 11 of the ejector 10 does not generate the suction force F1 (see FIG. 2). The ejector 10 does not take in the off-gas G2 that is present in the return path 3e. Thus, the controller 20 temporarily stops the function in which the ejector 10 takes in the off-gas G2 by continuously opening the first control valve 21 to the second opening degree A2. Accordingly, the return of the off-gas G2 to the supply path 3s (see FIG. 2) is stopped. As a result, only the fuel component gas G1 having the target value S1 is supplied to the fuel cell 2 as the fuel gas. That is to say, even with the fuel gas of the same target value S1, the fuel gas during particular operations contains a higher concentration of the hydrogen gas (i.e., the fuel component gas) than the fuel gas during normal operations.

Figure 7:
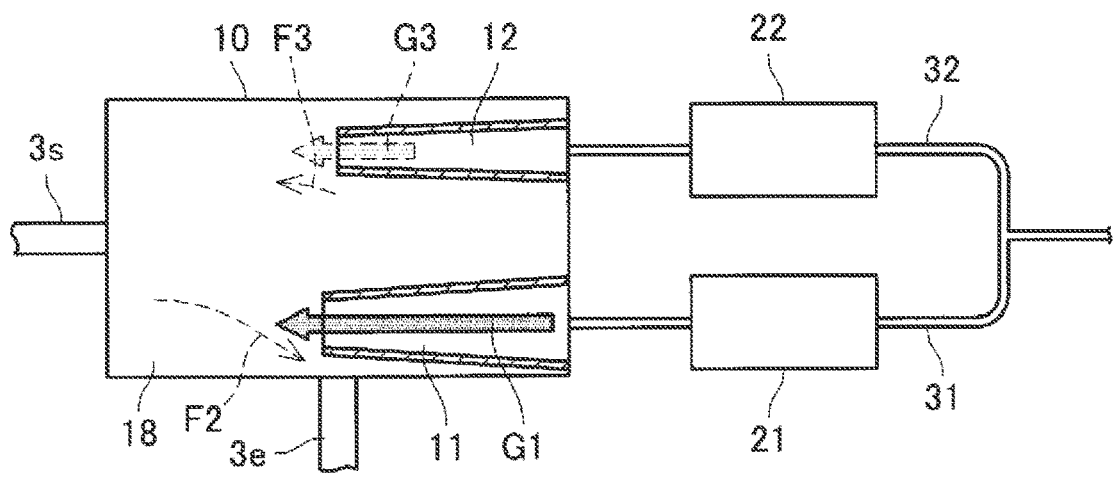
FIG. 7 illustrates an enlarged view of the surroundings of the ejector 10 according to the first embodiment during particular operations.

Also, the value of the fuel component gas supply amount Sf at which the off-gas intake amount Cf becomes zero (hereinafter referred to as "supply value at which suction force is not generated") may change depending on the shape of the first nozzle 11, the pressure inside of the fuel gas tank 8 (see FIG. 1), the diameter of the first supply path 31, and so forth. For example, when a target value S2 during particular operations is smaller than the target value S1 (i.e., supply value at which suction force is not generated), the off-gas intake amount Cf becomes negative, as shown in FIG. 6. Accordingly, when the target value S2 is smaller than the supply value at which suction force is not generated, the pressure in the mixing portion 18 of the ejector 10 becomes a positive pressure with respect to the return path 3e, and as shown in FIG. 7, a discharge force F2 is generated at the mixing portion 18. As a result, there is a concern that the fuel component gas G1 in the mixing portion 18 may reflux into the return path 3e due to the discharge force F2.

When the target value S2 is smaller than the supply value at which suction force is not generated, the controller 20 continuously opens the first control valve 21 to an opening degree that corresponds to the target value S2 and that is even smaller than the second opening degree A2. Further, the controller 20 intermittently opens the second control valve 22 with a relatively small duty ratio. Accordingly, a small amount of the fuel component gas G3 passes through the second nozzle 12, and the pressure around the outlet of the second nozzle 12 becomes negative. As a result, suction force F3 is generated around the outlet of the second nozzle 12. This suction force F3 cancels out the discharge force F2, and suppresses the fuel component gas G1 from refluxing from the mixing portion 18 to the return path 3e. Also, as described above, the diameter of the second nozzle 12 is smaller than the diameter of the first nozzle 11. Accordingly, when the fuel component gas G3 passes through the second nozzle 12, the flow velocity of the fuel component gas G3 at the outlet is higher than the flow velocity when the fuel component gas G1 passes through the first nozzle 11. As a result, the suction force F3 is generated in the mixing portion 18 at a relatively early timing. By using two nozzles having different diameters, the timing of generating suction force can be controlled.

Figure 8:
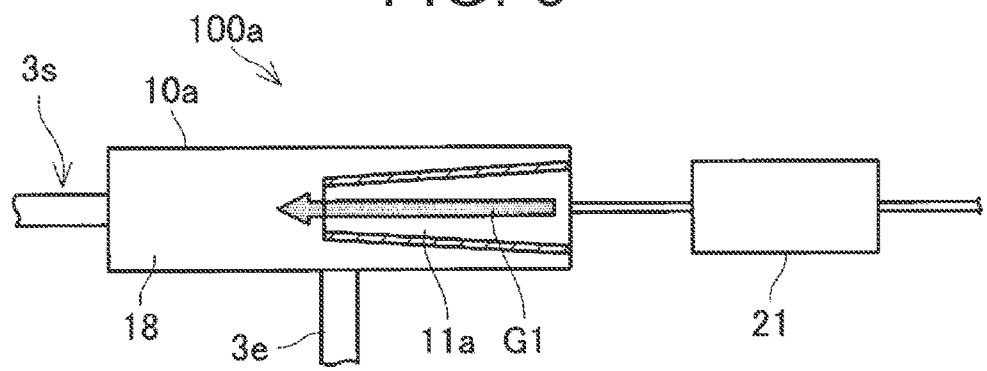
FIG. 8 illustrates an enlarged view of surroundings of an ejector 10a according to a second embodiment.

A fuel cell system 100a according to a second embodiment will be described with reference to FIG. 8. The fuel cell system 100a is an arrangement in which the ejector 10 of the fuel cell system 100 in FIG. 1 is replaced with an ejector 10a. As illustrated in FIG. 8, the ejector 10a according to the second embodiment is provided with a first nozzle 11a alone, and is not provided with the second nozzle 12 (see FIG. 2). Accordingly, the fuel cell system 100a includes neither the second supply path 32 (see FIG. 1) nor the second control valve 22.

The controller 20 (see FIG. 2) intermittently opens the first control valve 21 to the first opening degree A1 (see FIG. 5) at a duty ratio corresponding to the target value S1 during normal operations in the fuel cell system 100a as well. Accordingly, suction force for taking in the off-gas is generated in the ejector 10a, and fuel gas containing the off-gas can be supplied to the fuel cell 2 (see FIG. 1). On the other hand, during particular operations, the controller 20 continuously opens the first control valve 21 to the second opening degree A2 that is smaller than the first opening degree A1. Further, when acquiring the target value S2 smaller than the supply value at which suction force is not generated, the controller 20 may intermittently open the first control valve 21 at a duty ratio corresponding to the target value S2. By making the opening degree of the first control valve 21 to be smaller than the first opening degree A1, the amount of the off-gas taken in from the return path 3e can be reduced. Thus, the hydrogen concentration of the fuel gas can be improved.

Although the embodiments have been described in detail above, these are only exemplary, and are not intended to limit the scope of claims. The technology set forth in the claims includes various modifications and variations of the specific examples exemplified above. Modifications of the above embodiments are listed below.

Modification 1

In the above-described embodiment, the first control valve 21 is intermittently opened in order to supply, to the fuel cell 2, the normal supply amount Sn of the fuel component gas G1 corresponding to the target value S1 during normal operations. In a modification, the controller 20 may intermittently open the second control valve 22 instead of the first control valve 21.

Modification 2

The diameter of the second nozzle 12 may be the same as the diameter of the first nozzle 11.

Modification 3

The controller 20 may continuously open the second control valve 22 to an opening degree corresponding to the target value S1 during particular operations.

Modification 4

The second control valve 22 may be a linear solenoid valve that can adjust the angle thereof.

Modification 5

In the above-described embodiment, the controller 20 determines that freezing has occurred in the fuel cell 2 when the pressure difference between the pressure sensors 5s and 5e exceeds the threshold value, and executes particular operations. In a modification, the controller 20 may determine that freezing has occurred in the fuel cell 2 when the outside air temperature is no higher than a threshold value instead, and execute particular operations. Further, the controller 20 may execute particular operations at times other than when freezing occurs in the fuel cell 2, such as when there is a need to supply fuel gas containing a high concentration fuel component.

Although specific examples of the disclosure are described in detail above, the examples are only exemplary and are not intended to limit the scope of the claims. The technology set forth in the claims includes various modifications and variations of the specific examples exemplified above. The technical elements described in the present specification or drawings exhibit technical utility alone or in various combinations, and are not limited to the combinations described in the claims at the time of application. The technology exemplified in the present specification or the drawings can achieve a plurality of objects at the same time, and achieving one of the objects itself has technical utility.

What is claimed is:

1. A fuel cell system comprising:
    a fuel cell configured to generate electricity by causing reaction of a fuel component contained in fuel gas;
    a supply path connected to a supply port of the fuel cell and configured to supply the fuel gas to the supply port;
    a control valve that is provided on the supply path and that is able to adjust an opening degree of the control valve;
    an ejector provided in a section on the supply path between the control valve and the fuel cell;
    a return path connected between an exhaust port of the fuel cell and the ejector and configured to return off-gas discharged from the exhaust port to the supply path by suction force generated by the ejector; and
    a controller configured to control the control valve, wherein the controller is configured to:
    selectively execute a normal operation in which at least the one control valve is intermittently opened at a duty ratio corresponding to a target value for a supply amount of the fuel gas, and a particular operation for supplying, to the fuel cell, fuel gas containing the fuel component at a higher concentration than in the normal operation;
    intermittently open the control valve to a first opening degree when the fuel gas is supplied to the fuel cell at a first supply amount in the normal operation; and
    continuously or intermittently open the control valve to a second opening degree smaller than the first opening degree when the fuel gas is supplied to the fuel cell at the first supply amount in the particular operation.

2. The fuel cell system according to claim 1, further comprising a second control valve, wherein the ejector includes:
    a first nozzle configured to supply the fuel gas from the control valve; and
    a second nozzle configured to supply the fuel gas from the second control valve.

3. The fuel cell system according to claim 2, wherein a diameter of the second nozzle is smaller than a diameter of the first nozzle.

4. The fuel cell system according to claim 2, wherein in the normal operation, when the fuel gas is supplied to the fuel cell at the first supply amount, the second control valve is intermittently opened instead of the control valve.

5. The fuel cell system according to claim 3, wherein the second control valve is intermittently opened in the particular operation as well.

6. The fuel cell system according to claim 1, further comprising:
    a first pressure sensor disposed on the supply path; and
    a second pressure sensor disposed on the return path.

* * * * *